(12) United States Patent
Sahter et al.

(10) Patent No.: US 11,892,919 B1
(45) Date of Patent: Feb. 6, 2024

(54) ZERO DOWNTIME AND ZERO FAILURE CUTOVER

(71) Applicant: INTUIT INC., Mountain View, CA (US)

(72) Inventors: Snezana Sahter, Mountain View, CA (US); Shivam Dixit, Bangalore (IN); Akash Sudhirbhai Shah, Bangalore (IN); Satyanarayana Thirumani, Bangalore (IN); Saroj Kumar Yadav, Bangalore (IN); Karan Bagaria, Bangalore (IN); Gokul Sarangapani, Bangalore (IN); Sivaraman Sathyamurthy, Bangalore (IN)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 18/331,017

(22) Filed: Jun. 7, 2023

(51) Int. Cl.
  *G06F 11/00* (2006.01)
  *G06F 11/20* (2006.01)
  *H04L 67/1061* (2022.01)

(52) U.S. Cl.
  CPC ........ *G06F 11/2028* (2013.01); *G06F 11/203* (2013.01); *H04L 67/1068* (2013.01)

(58) Field of Classification Search
  CPC .............. G06F 11/203; G06F 11/2028; G06F 11/2056; G06F 11/2058; G06F 11/2069; G06F 11/2089; G06F 11/2092; G06F 11/2094; G06F 16/14; G06F 16/148; G06F 16/182; G06F 16/1837; G06F 16/1834; G06F 16/214; G06F 16/27; H04L 67/1068; H04L 67/1061

See application file for complete search history.

(56) References Cited

U.S. PATENT DOCUMENTS

| | | | |
|---|---|---|---|
| 9,122,698 B2* | 9/2015 | Lacapra | G06F 3/067 |
| 9,800,690 B1* | 10/2017 | Clarke | H04L 67/563 |
| 2008/0235593 A1* | 9/2008 | Nagata | G06F 16/168 |
| | | | 715/733 |
| 2013/0007239 A1* | 1/2013 | Agarwal | H04L 63/02 |
| | | | 709/223 |
| 2017/0034270 A1* | 2/2017 | Nagasubramaniam | |
| | | | G06F 15/167 |
| 2020/0059515 A1* | 2/2020 | Kulkarni | H04L 67/1097 |

* cited by examiner

*Primary Examiner* — Marc Duncan
(74) *Attorney, Agent, or Firm* — DLA PIPER LLP (US)

(57) ABSTRACT

An apparatus may include a database and a processor in communication with at least one network. The processor may be configured to instantiate an application stack comprising a data missing detector, a data source router, and a response handler. The data missing detector may be configured to receive a request for data and determine whether the data is available from the database. The data source router may be configured to identify an alternate database from which to obtain the data when the data is not available from the database and route the request for data through the at least one network to an alternate processor associated with the alternate database. The response handler may be configured identify responsive data to a routed response received from another processor in the database and send the responsive data to a requesting device. Multiple apparatuses may form a distributed system.

18 Claims, 5 Drawing Sheets

ZERO DOWNTIME AND ZERO FAILURE CUTOVER

BACKGROUND

Many computing systems are distributed, having components physically and/or logically separate from one another that communicate with one another through one or more networks. Distributed computing systems can have heterogeneous databases, where different nodes of the distributed system use different database schema and/or components.

Within the distributed computing realm, migrating applications from one database to another has become very important to achieve speed, performance, and scale to serve millions or even billions of users. Migration tools exist, such as Oracle Golden Gate and AWS Data Migration Service, that support one time migration of data as well as Change Data Capture (CDC) to keep separate databases in sync. But even with these tools, an optimized CDC would incur a lag of tens of seconds to minutes before the other database can see this change. Because of this lag, if a change occurs in one database, requests received on the other database during the lag period will result in data retrieval failures from the standpoint of the requester. These are essentially "read after write" problems. This issue is aggravated in high traffic applications which can deal with thousands of transactions per second and terabytes of changes per day. Most distributed systems solve this issue by having a maintenance window ranging from a few minutes to a few hours, resulting in a non-zero downtime cutover. Other systems attempt to solve these problems using custom dual read/dual write solutions where all data is written to all endpoints, which is not only costly in terms of computation and bandwidth, but which also tends to increase instability of the application due to complex parallel changes taking place.

BRIEF DESCRIPTIONS OF THE DRAWINGS

DETAILED DESCRIPTION OF SEVERAL EMBODIMENTS

Systems and methods described herein can provide cutover or migration from one database to another without customer failure and without downtime, in contrast with prior techniques that either required expensive and complex dual read/write solutions or relied on downtime and caused failures for in-flight requests during downtime. Example embodiments can provide zero customer failures even for in-flight requests with minimally intrusive solutions.

The systems and methods described herein can provide separate processing stacks for each database in a distributed computing architecture. Each stack can communicate with one another. In contrast with solutions using maintenance windows that can cause customer failures, disclosed embodiments have no maintenance window. As described in detail below, this can be architecturally achieved using remote calls among stacks. For example, alternate stacks can be used to route traffic to alternate distributed elements. In a two-stack example, both stacks can receive traffic, and a router component can intelligently proxy a call to an alternate stack.

In contrast with solutions wherein an application performs dual reads/writes at every database level interaction (making the solution very error-prone, expensive, and less maintainable), disclosed embodiments use a different architectural approach. For example, application logic can be abstracted from a change, and a router component sitting in a network edge can separate out a proxy interaction. This enables the call for data to go to the source that has the data, rather than requiring all sources to have identical data at all times.

Figure 1:
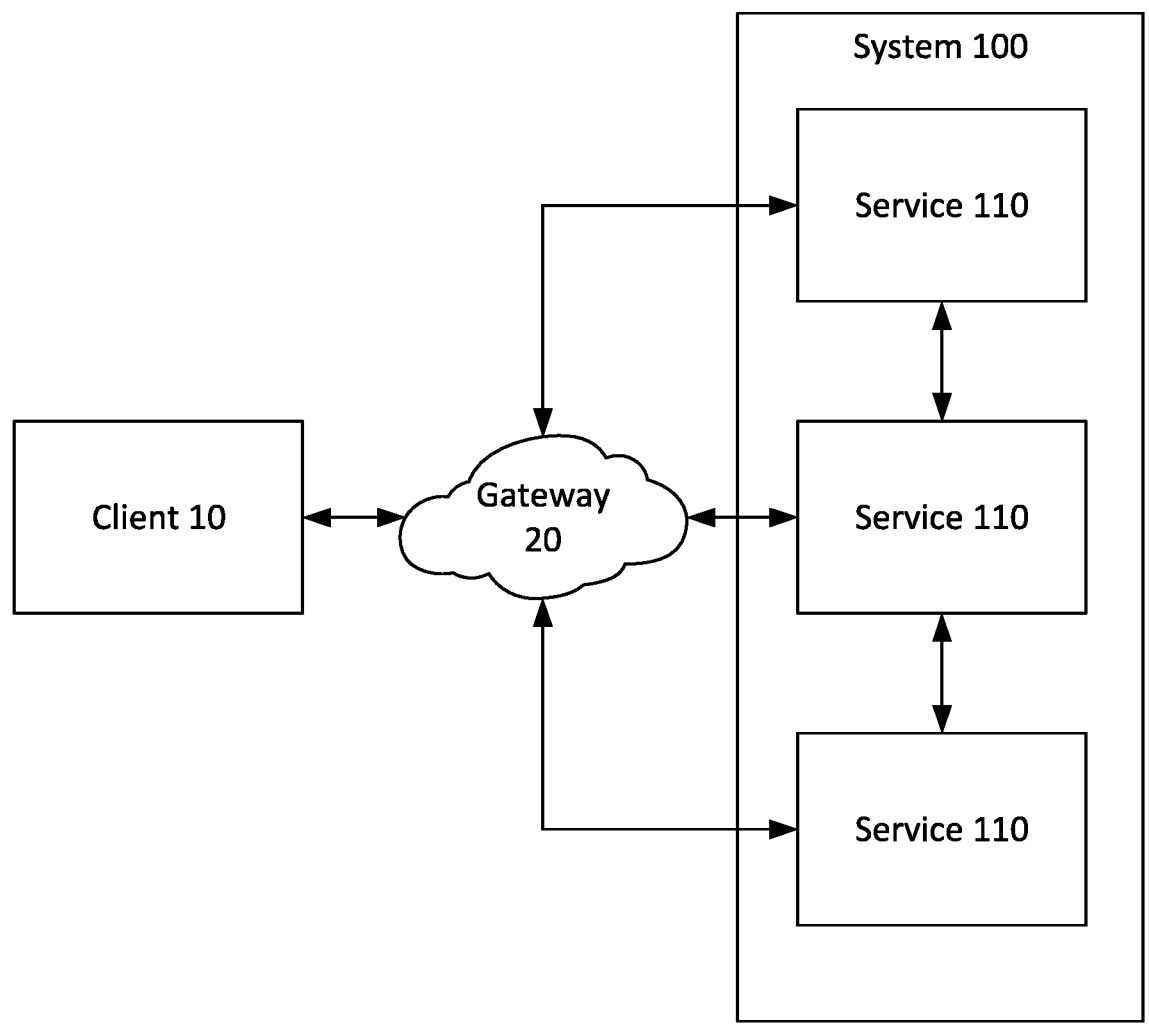
FIG. 1 shows an example distributed system according to some embodiments of the disclosure.

FIG. 1 shows an example distributed system 100 according to some embodiments of the disclosure. System 100 may include a variety of hardware, firmware, and/or software components that interact with one another, such as a plurality of distributed services 110. Services 110 are described in greater detail below, but in general, services 110 can be any computing services each having their own local data. Some components within system 100 may communicate with one another using networks. Some components may communicate with client(s), such as client 10, through one or more networks (e.g., the Internet, an intranet, and/or one or more networks that provide a cloud environment). For example, as described in detail below, client 10 can request data and/or processing from services 110, and services 110 can determine how to obtain the data and provide it to client 10 with zero downtime and zero failure cutover capabilities. In some embodiments, system 100 can be separated from client 10 by gateway 20, which may provide security for system 100. Each component may be implemented by one or more computers (e.g., as described below with respect to FIG. 5).

Figure 3:
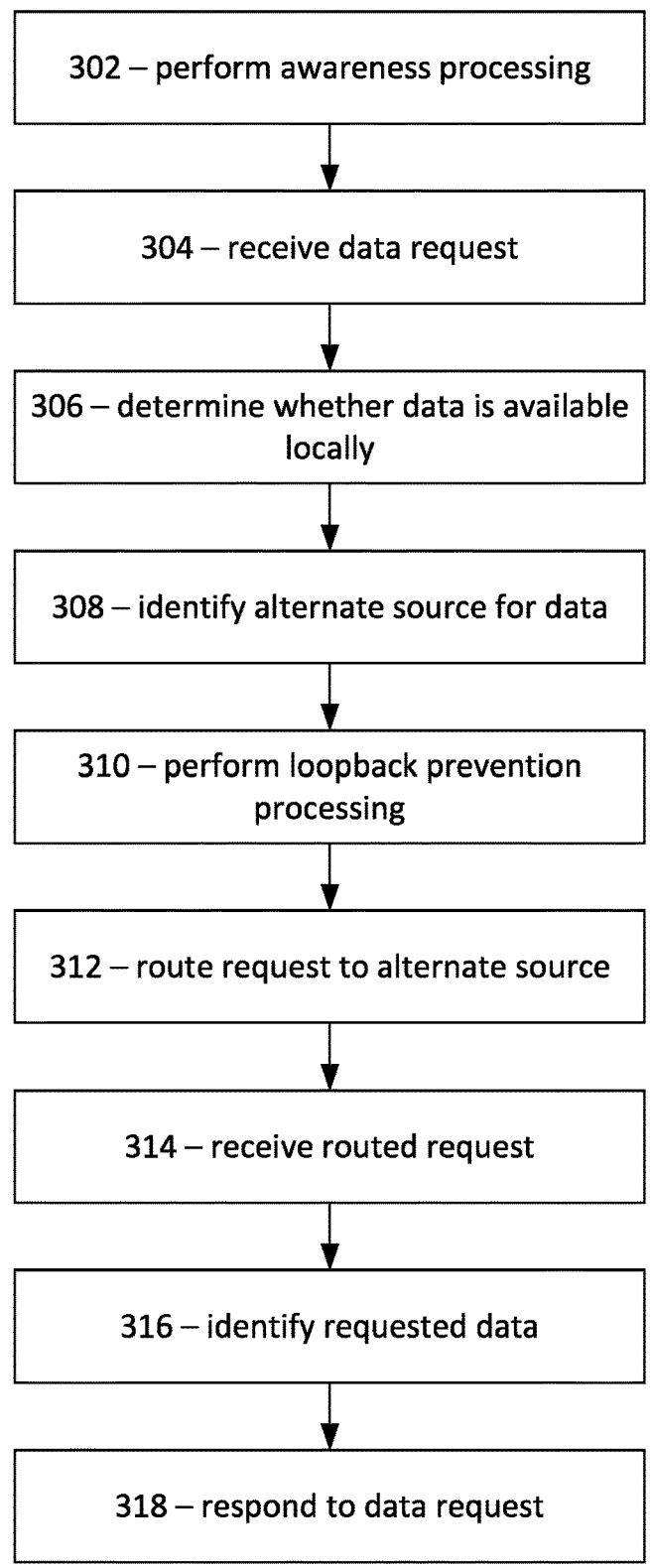
FIG. 3 shows an example data retrieval process according to some embodiments of the disclosure.
Figure 4:
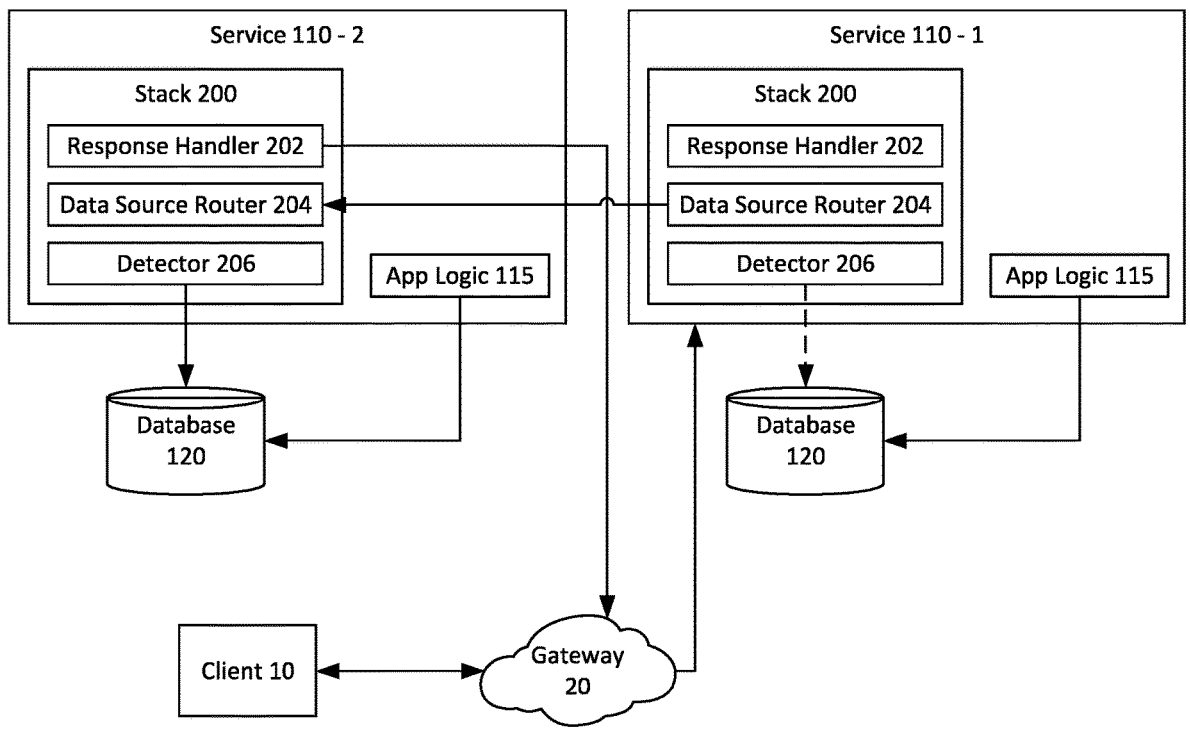
FIG. 4 shows details of a portion of an example distributed system according to some embodiments of the disclosure.

As described in detail below, system 100 can perform processing to respond to client 10 requests with zero downtime and zero failure cutover as required. For example, FIGS. 2-4 illustrate the functioning of the illustrated components in detail.

Elements illustrated in FIG. 1 (e.g., system 100 including services 110, gateway 20 (which may or may not be part of system 100), and/or client 10) are each depicted as single blocks for ease of illustration, but those of ordinary skill in the art will appreciate that these may be embodied in different forms for different implementations. For example, while gateway 20 and system 100 (including services 110) are depicted separately, any combination of these elements may be part of a combined hardware, firmware, and/or software element. Likewise, while services 110 are depicted as parts of a single system 100, any combination of these elements may be distributed among multiple logical and/or physical locations. Indeed, the disclosed embodiments provide improvements to distributed computing arrangements. Also, while one gateway 20 one client 10, and one system 100 (with three services 110) are illustrated, this is for clarity only, and multiples of any of the above elements may be present. In practice, there may be single instances or multiples of any of the illustrated elements, and/or these elements may be combined or co-located.

In the following descriptions of how system 100 functions, several examples are presented. These examples are in the context of generic application logic or business processing on data obtained from distributed database elements. However, those of ordinary skill in the art will appreciate that these examples are merely for illustration, and system 100 and its methods of use and operation are extendable to other application and data contexts.

Figure 2:
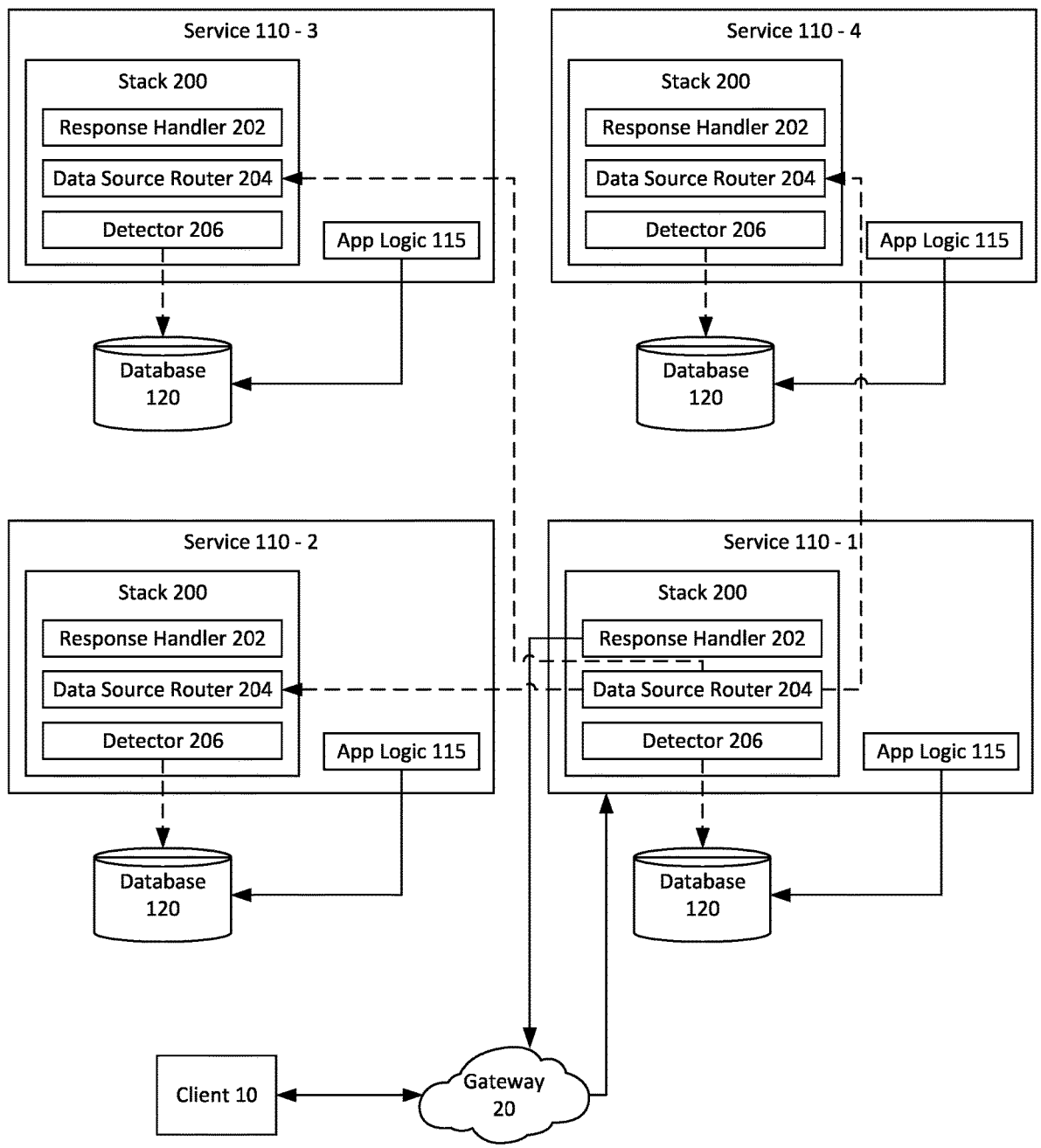
FIG. 2 shows details of an example distributed system according to some embodiments of the disclosure.

FIG. 2 shows details of an example distributed system 100 according to some embodiments of the disclosure. In FIG. 2, elements of services 110 are shown in detail. For example, services 110 may include stacks 200 that can identify and route data requests to an alternate stack 200 in case of a "read after write" scenario where data written at one distributed service 110 has not yet propagated to other distributed services 110. As described in detail below, stacks 200 can include components configured to identify missing data, route requests to alternate stacks securely with loopback protection, and send a response back to a client. These features can thereby provide zero downtime and zero failure cutover capabilities.

The example system 100 of FIG. 2 includes four services 110, labeled service 110-1, service 110-2, service 110-3, and service 110-4. Each service 110 can be operated by one or more of a plurality of processors in communication with one another through at least one network.

Each example service 110 can include a local or otherwise associated database 120 and application logic 115 that may be configured to perform business processing such as obtaining data requested by client 10 from its database 120 and serving the data to client 10. Accordingly, each respective processor/service 110 may be associated with a separate respective database 120 that is an assigned database for the respective processor/service 110. The plurality of databases 120 included within system 100 may be of the same or different standard or custom types (e.g., one or more of databases 120 may be Oracle databases, one or more of databases 120 may be PostgreSQL databases, etc.).

Each respective processor/service 110 may be configured to instantiate a respective application stack 200 of a plurality of application stacks 200. Each example service 110 can include its own stack 200, such that in effect, each database 120 is associated with a stack 200. Each stack 200 may include a response handler 202, a data source router 204, and a data missing detector 206. When a request for data comes from client 10, and in some embodiments through gateway 20, to a service 110, the response handler 202, data source router 204, and data missing detector 206 may function to provide ero downtime and zero failure cutover operation as necessary.

Data missing detector 206 may be configured to receive a request for data and determine whether the data is available from the assigned database 120 for the respective processor/service 110. One aspect in achieving a zero downtime and zero failure migration is the ability to identify whether a given service 110 has data responsive to a request. Thus, when a service 110 receives a request, data missing detector 206 may identify whether data responsive to the request can be served by the current service 110 or not. For example, data missing detector 206 may check whether reads from the database 120 fail (e.g., with a returned NoDataFound message). NoDataFound may act as the trigger point for data missing detector 206 to signal data source router 204.

Data source router 204 may be configured to identify an alternate database 120 of the plurality of databases 120 from which to obtain the data in response to the data missing detector 206 determining that the data is not available from the assigned database 120 for the respective processor/service 110 and route the request for data through the at least one network to an alternate processor/service 110 associated with the alternate database 120. Thus, data source router 204, once notified about the missing data, may take control and identify an alternate application stack 200 from which the data can be fetched. Data source router 204 may be self-aware and also aware of the alternate application stack 200 from which the missing data can be fetched. Data source router 204 may prevent an infinite loop using loopback protection, as described in detail below.

Response handler 202 may function as a response messaging component that may send a response to the client 10 request to client 10 (e.g., send data responsive to the request once such data is found within system 100). Thus, response handler 202 may be configured to receive a routed response from another of the plurality of processors/services 110, identify responsive data to the routed response in the assigned database 120 for the respective processor/service 110, and send the responsive data to the requesting client 10 device.

Processing by the components of one or multiple application stacks 200 to respond to client 10 requests may proceed as described in reference to the following figures.

FIG. 3 shows an example data retrieval process 300 according to some embodiments of the disclosure. System 100, along with client 10 and/or gateway 20 in some embodiments, can perform process 300 to retrieve data from distributed element(s) of system 100 with zero downtime and zero failure cutover among distributed elements when demanded. FIG. 4 shows details of a portion of an example distributed system 100 according to some embodiments of the disclosure, where only two services of FIG. 2 (service 110-1 and service 110-2) are included for ease of illustration and to demonstrate some of the processing of process 300 within system 100.

At 302, data source routers 204 of the respective stacks 200 of the distributed services 110 can perform awareness processing. Awareness processing may be considered as pre-processing to the remaining portions of process 300, enabling data source routers 204 to subsequently identify and communicate with one another. Each data source router 204 can become a self-aware node of the network or networks connecting the distributed services 110, including information about itself and other data source routers 204 of the system 100. This can be achieved in a variety of ways.

For example, each stack 200 on each distributed service 110 can be instantiated by running the same application on each distributed service 110. Each data source router 204 of each stack 200 can be configured with data defining its own identity within system 100 and other identities of other data source routers 204 within system 100. Because each data source router 204 can have parameters defined for itself and the other data source routers 204 within system 100, each data source router 204 can check the status of the other data source routers 204 and communicate with the other data source routers 204. In some embodiments, one or more of the data source routers 204 can broadcast information about itself to at least one other data source router 204 (e.g., periodically or upon startup) so that other data source routers 204 have information about its status (e.g., online presence and/or content of data in its associated database 120).

Stacks 200 can use the parameters to interpret requests for data received from client 10, as described below. For example, based on a key that comes as an input to the stack 200 in or with a data request, data source router 204 can look up the data corresponding to the key in database 120. The key itself can have a specific format that encodes, describes, or contains the identity of the stack 200 where the data was originally created. Thus, as described below, if the data is not found in the database 120 of the stack 200 receiving the request, then the format of the key can determine the origin information of the original stack 200 to which the request can be routed. For example, keys may have a format such as the following (or other formats capable of identifying stacks):

Key: aa** was created in stack 200 of service 110-1**
    Key: ab** was created in stack 200 of service 110-2**
    Key: ba** was created in stack 200 of service 110-3**
    Key: bb** was created in stack 200 of service 110-4**

In another example, each data source router 204 can report its presence to one or more message brokers of system 100. For example, one or more message brokers, of any configuration familiar to those of ordinary skill in the art, may be disposed within the one or more networks used by system 100 to link the distributed services 110 with one another. Messages between services 110 (and therefore data source routers 204) may be routed by or through such message brokers. The message brokers may be aware of the status and/or parameters of data source routers 204, and thus may be able to provide such information to individual data source routers 204 during subsequent portions of process 200 if needed or requested.

At 304, system 100 may receive a request for data from client 10. The request may include a request for data stored, or expected by client 10 to be stored, within system 100. However, in many cases, client 10 may not have specific information about which database 120 stores the requested data. Indeed, client 10 may be indifferent to which database 120 stores the requested data, as long as some element of system 100 is able to respond by supplying the requested data. For example, as described above, the request may identify the data and/or may include a key that is associated with the identified data. In any event, one of the distributed services 110 may receive the request. For example, a data missing detector 206 instantiated by a first processor of a first service 110 associated with a first database 120 may receive the request for data. In the example of FIG. 4, the first service 110 whose data missing detector 206 receives the request is service 110-1.

In some embodiments, gateway 20 may receive the request for data from client 10 before it makes its way to the data missing detector 206 of the first service 110. Gateway 20 may be a network gateway of any configuration familiar to those of ordinary skill in the art. Gateway 20 may provide data security for system 100, using data encryption, access control, and/or other techniques to prevent unauthorized intrusion and/or access to system 100 by external computing devices. Elements of system 100 (e.g., services 110 and the data stored in their associated databases 120) can be secured, by the gateway, from at least one external network and devices thereon. Accordingly, the gateway 20 may be disposed between the requesting client 10 device and the elements of system 100. As such, client 10 may be required to provide credentials, and/or data exchanged between client 10 and elements of system 100 may be encrypted and/or otherwise secured. In addition to the security benefits provided by gateway 20, the presence of gateway 20 may mean that communications between elements of system 100 can be in clear, and therefore unencrypted, behind the gateway 20. Allowing communications between system 100 elements in clear can improve the performance of system 100 by eliminating encryption/decryption steps at message endpoints within system 100, in some embodiments.

Returning to FIG. 3, at 306, data missing detector 206 that received the request may determine whether the requested data is available locally in the first database 120 with which it is associated. For example, data missing detector 206 may request the data from its local database 120. If the data is present in the local database 120, response handler 202 in the same stack 200 may simply respond to the request by providing the data from the local database 120. Response handler 202 may send the data to client 10 through gateway 20 if applicable. At this point, if the data was found locally, process 300 may end. Alternatively, if the data was not found locally, database 120 may return a NoDataFound message or other error message, indicating that the data is not available in the local database 120.

At 308, in response to data missing detector 206 determining that the data is not available from the first local database 120, data source router 204 of the same stack 200 may identify a second database 120 from which to obtain the data.

In some embodiments, data missing detector 206 can use information about the other stacks 200 of the system 100 (e.g., information about other data source routers 204 obtained at 302) to determine which of the other stacks 200 of the system 100 is associated with a database 120 where the data was generated, and therefore may be likely found. For example, information describing the requested data within the request received at 304 may inform data missing detector 206 where the data was created. Such information may include a unique identifier such as an authcode or the like, and the unique identifier may define the service 110 that created the data and stored the data in its local database 120. Data missing detector 206 can use information about other services 110 obtained from awareness processing to determine which service 110 is associated with the unique identifier.

For example, data missing detector 206 can first look up the data in the database 120 of the local stack 200. If data is not found, data missing detector 206 can send a "data not found" signal to the data source router 204. Data source router 204 can then route the request to the stack 200 where the requested data was originally created. Data source router 204 can identify the stack 200 where the requested data was originally created based on the key from the incoming request, as described above. For example:

Key: aa** was created in stack 200 of service 110-1**
    Key: ab** was created in stack 200 of service 110-2**
    Key: ba** was created in stack 200 of service 110-3**
    Key: bb** was created in stack 200 of service 110-4**

In other cases, such as where no unique identifier is available or where information about other services 110 is lacking, data missing detector 206 can perform churn routing or parallel routing at 312 (discussed below) as an alternative to specifically identifying a likely source of the requested data. However, determining which of the other stacks 200 of the system 100 is associated with a database 120 where the data was generated can realize bandwidth and speed improvements over the alternative techniques.

At 310, in preparation for routing the request for data to one or multiple other services 110, data source router 204 can perform loopback protection processing in some embodiments. For example, data source router 204 can add loopback protection data to the message that is to be routed. The loopback protection data may be configured to prevent the stack 200 of the receiving service 110 from routing the request back to the stack 200 of the sending service 110. For example, the loopback protection data can include an identity of the request source within system 100 (e.g., the stack 200 and/or service 110 that initially received the request), so the stack 200 of the receiving service 110 is informed that it should not route the request to the identified source. In some embodiments, loopback protection data may prevent the stack 200 of the receiving service 110 from routing the request to any other stack at all (e.g., the presence of the loopback protection data in the message is taken as an indication that the source of the request is internal and thus should not be re-routed).

At 312, data source router 204 can route the request for data to the alternate source identified at 308. To ensure secured routing without incurring additional latency, last mile headers may be passed to the HTTP request header so that the calls need not be routed again through API-GW which will incur additional latency. Thus, data source router 204 can send the request, with added loopback protection and/or last mile headers in some embodiments, through at least one network to a second processor/service 110 instantiating a second stack 200 associated with the second database 120 that was identified as a possible source as described above. The request can be routed according to any technique familiar to those of ordinary skill in the art, such as using the HTTP protocol to proxy the request.

At 314, the data source router 204 of the alternate source identified at 308 can receive the request routed from the first service 110. In the example of FIG. 4, service 110-2 receives the request from service 110-1.

Returning to FIG. 3, at 316, response handler 202 may identify the requested data in the second database 120, which is its local database 120. In some embodiments, the data may simply be retrieved from the database 120. In other embodiments, and/or depending on the nature of the request from client 10, application logic 115 may process and/or retrieve the data from the database 120. For example, if the request from the client 10 is not only a request for data retrieval but also requests processing of the data and return of a result of such processing, application logic 115 may perform the requested processing on the data and provide the result thereof to response handler 202.

At 318, response handler 202 may respond to the data request, for example by sending the data or processed result from 316 to client 10 and/or to one or more of the services 110 for processing by service(s) 110. The response may be sent through gateway 20 if applicable. In the example of FIG. 4, response handler 202 of service 110-2 sends the response. This can be possible due to the provisioning of last mile headers as noted above, for example. Allowing the response to come directly from service 110-2 (after processing by service 110-2 if applicable), rather than requiring it to go back to service 110-1 that initially received the request, can improve response time and/or save bandwidth, for example.

Figure 5:
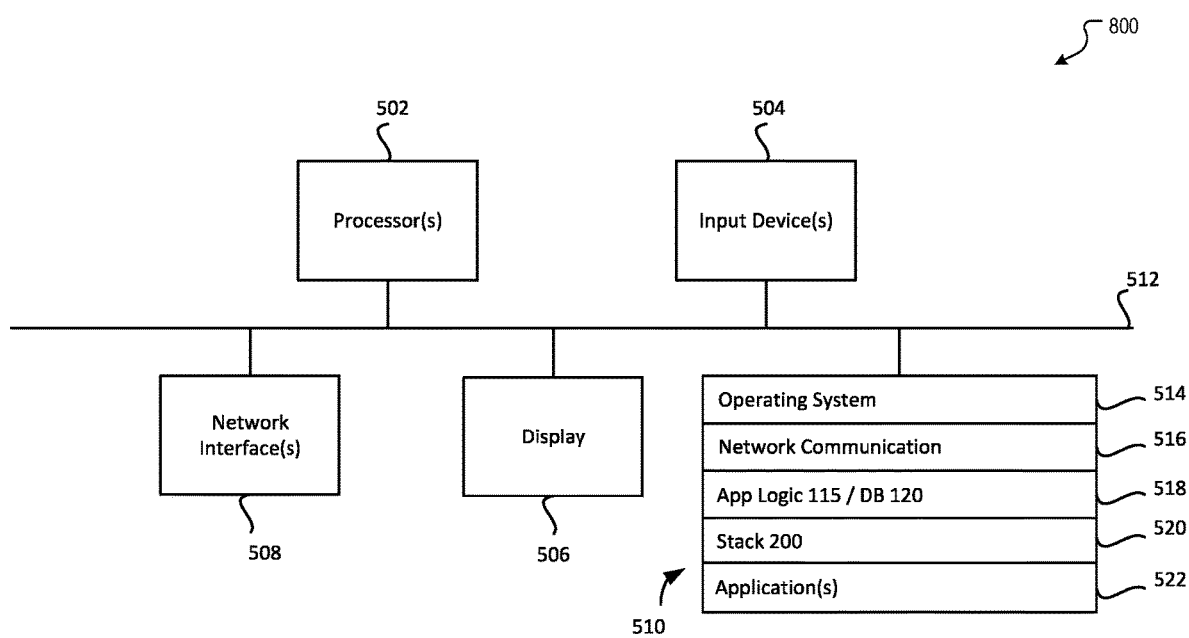
FIG. 5 shows a computing device according to some embodiments of the disclosure.

FIG. 5 shows a computing device 500 according to some embodiments of the disclosure. For example, computing device 500 may function as a single service 110 or any portion(s) thereof, or multiple computing devices 500 may function as a service 110.

Computing device 500 may be implemented on any electronic device that runs software applications derived from compiled instructions, including without limitation personal computers, servers, smart phones, media players, electronic tablets, game consoles, email devices, etc. In some implementations, computing device 500 may include one or more processors 502, one or more input devices 504, one or more display devices 506, one or more network interfaces 508, and one or more computer-readable mediums 510. Each of these components may be coupled by bus 512, and in some embodiments, these components may be distributed among multiple physical locations and coupled by a network.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 512 may be any known internal or external bus technology, including but not limited to ISA, EISA, PCI, PCI Express, NuBus, USB, Serial ATA or FireWire. In some embodiments, some or all devices shown as coupled by bus 512 may not be coupled to one another by a physical bus, but by a network connection, for example. Computer-readable medium 510 may be any medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 510 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 may establish and maintain network connections (e.g., software for implementing communication protocols, such as TCP/IP, HTTP, Ethernet, telephony, etc.).

Application logic 115 and/or database 120 software may include the system elements and/or the instructions that enable computing device 500 to perform the basic functioning of a distributed service 110 within system 100. Stack 200 software 520 may include the system elements and/or the instructions that enable computing device 500 to perform the zero downtime and zero failure cutover processing of system 100 (e.g., process 300) as described above. Application(s) 522 may be an application that uses or implements the outcome of processes described herein and/or other processes. In some embodiments, the various processes may also be implemented in operating system 514.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system comprising:
    a plurality of databases; and
    a plurality of processors in communication with one another through at least one network, each respective processor of the plurality of processors being associated with a separate respective database, of the plurality of databases, that is an assigned database for the respective processor, each respective processor being configured to instantiate a respective application stack of a plurality of application stacks, each respective application stack comprising:
    a data missing detector configured to:
        receive a request for data, and
        determine whether the data is available from the assigned database for the respective processor;
    a data source router configured to:
        identify an alternate database of the plurality of databases from which to obtain the data in response to the data missing detector determining that the data is not available from the assigned database for the respective processor,
        route the request for data through the at least one network to an alternate processor of the plurality of processors associated with the alternate database, and
        receive a routed response from another of the plurality of processors; and
    a response handler configured to:
        identify responsive data to the routed response in the assigned database for the respective processor, and
        send the responsive data to a requesting device.

2. The system of claim 1, further comprising a gateway between the plurality of processors and the requesting device, the gateway securing the plurality of processors from at least one external network.

3. The system of claim 2, wherein the plurality of processors are configured to communicate with one another through the at least one network in clear behind the gateway.

4. The system of claim 1, wherein the data source router is configured to route the request with loopback protection data, the loopback protection data being configured to prevent the alternate processor from routing the request to another one of the plurality of processors.

5. The system of claim 1, wherein each data source router of each respective application stack is configured as a self-aware node of the at least one network including information about itself and other data source routers of the system.

6. The system of claim 5, wherein each data source router of each respective application stack is configured to identify the alternate database by identifying, from the information about the other data source routers of the system, which of the other application stacks of the system is associated with a database of the plurality of databases where the data was generated.

7. The system of claim 1, wherein each data source router of each respective application stack is configured to broadcast information about itself to other data source routers of the system.

8. A method comprising:
receiving, by a data missing detector instantiated by a first processor associated with a first database, a request for data;
determining, by the data missing detector, whether the data is available from the first database;
identifying, by a data source router instantiated by the first processor, a second database from which to obtain the data in response to the data missing detector determining that the data is not available from the first database;
routing, by the data source router, the request for data through at least one network to a second processor associated with the second database, the routing comprising adding loopback protection data, the loopback protection data being configured to prevent the second processor from routing the request to the first processor;
receiving, by a second data source router instantiated by the second processor, the routed request for data from the data source router;
identifying, by a response handler instantiated by the second processor, the data in the second database; and
sending, by the response handler, the data to a requesting device.

9. The method of claim 8, further comprising securing, by a gateway, the first processor and the second processor from at least one external network, wherein the gateway is between the requesting device and the first processor and the second processor.

10. The method of claim 9, wherein communications between the first processor and the second processor are in clear behind the gateway.

11. The method of claim 8, wherein the data source router instantiated by the first processor is configured as a self-aware node of the at least one network including information about itself and other data source routers of the system.

12. The method of claim 11, wherein the identifying comprises identifying, from the information about the other data source routers of the system, which of the other application stacks of the system is associated with a database where the data was generated.

13. The method of claim 8, further comprising broadcasting, by the data source router instantiated by the first processor, information about itself to at least one other data source router.

14. An apparatus comprising:
a database; and
a processor in communication with at least one network and associated with the database, the processor being configured to instantiate an application stack comprising:
a data missing detector configured to:
receive a request for data, and
determine whether the data is available from the database;
a data source router configured to:
identify an alternate database available through the at least one network from which to obtain the data in response to the data missing detector determining that the data is not available from the database,
route the request for data through the at least one network to an alternate processor associated with the alternate database, wherein the request is routed with loopback protection data, the loopback protection data being configured to prevent the alternate processor from routing the request to the processor, and
receive a routed response from another processor; and
a response handler configured to:
identify responsive data to the routed response in the database, and send the responsive data to a requesting device.

15. The apparatus of claim 14, wherein a gateway is disposed between the apparatus and the requesting device, the gateway securing the apparatus from at least one external network, and wherein the processor is configured to communicate with the alternate processor through the at least one network in clear behind the gateway.

16. The apparatus of claim 14, wherein the data source router is configured as a self-aware node of the at least one network including information about itself and other data source routers of the at least one network.

17. The apparatus of claim 16, wherein the data source router is configured to identify the alternate database by identifying, from the information about the other data source routers of the at least one network, which of the other application stacks of the at least one network is associated with a database available through the at least one network where the data was generated.

18. The apparatus of claim 14, wherein the data source router is configured to broadcast information about itself to other data source routers of the at least one network.

* * * * *